UNITED STATES PATENT OFFICE.

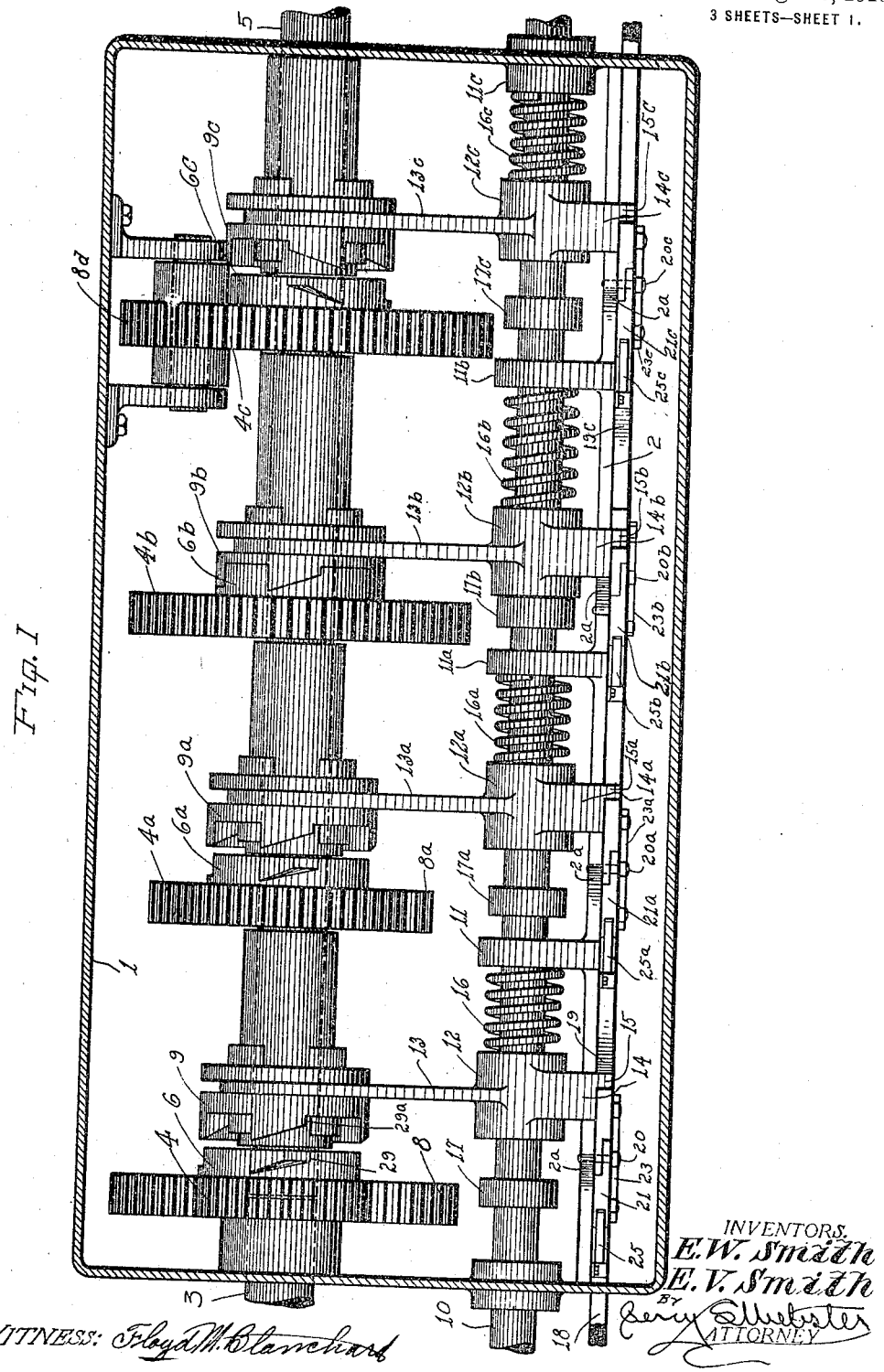

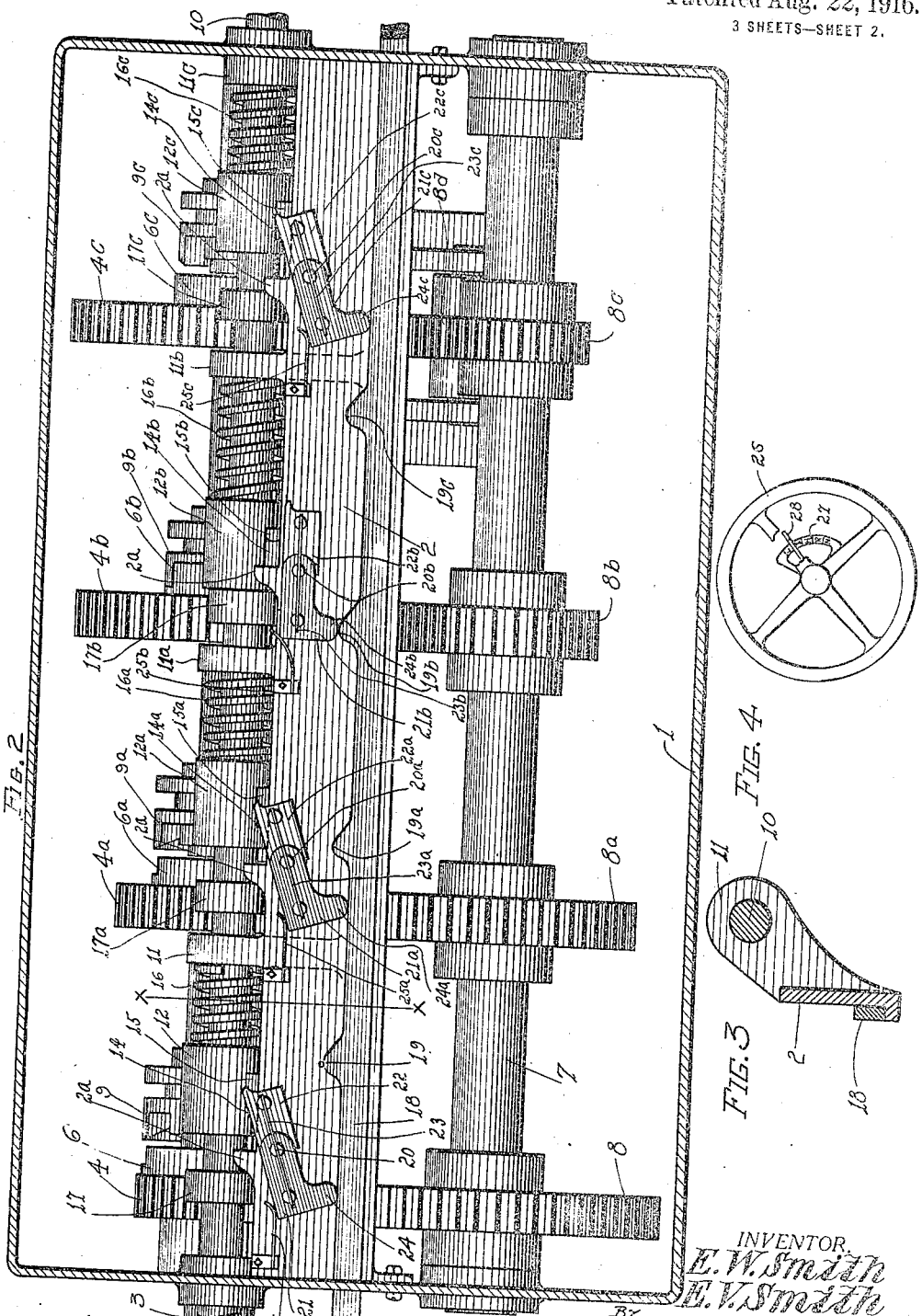

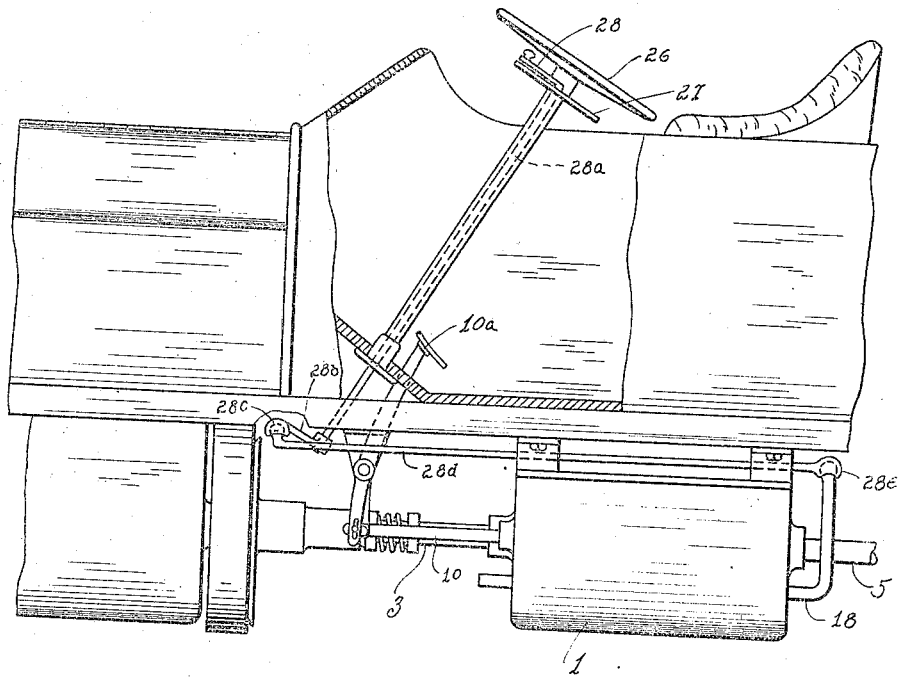

EARL W. SMITH AND EUGENE V. SMITH, OF SACRAMENTO, CALIFORNIA.

TRANSMISSION-GEARING FOR MOTOR-VEHICLES.

1,195,284.　　　　　Specification of Letters Patent.　　Patented Aug. 22, 1916.

Application filed October 18, 1915. Serial No. 56,351.

*To all whom it may concern:*

Be it known that we, EARL W. SMITH and EUGENE V. SMITH, both citizens of the United States, residing at Sacramento, in the county of Sacramento, State of California, have invented certain new and useful Improvements in Transmission-Gearing for Motor-Vehicles; and we do declare the following to be a full, clear, and exact description of the same, reference being had to the accompanying drawings, and to the characters of reference marked thereon, which form a part of this application.

This invention relates to improvements in motor driven vehicles and particularly to the transmission gearing thereof, the object of the invention being to produce a gearing by the use of which the various speeds desired can be had without the necessity of the use of a shift lever or levers. We aim to substitute for the shift levers a pre-selector whereby one speed may be selected while the gears are still operating at another speed, and then, through the medium or action of the clutch lever, the gears are changed automatically as the clutch is thrown out of and back into engagement. At the same time, we have so arranged the operating mechanism as to make it "fool proof" so that there can be no jamming of gears nor any chance of any interference between the gears.

By the use of such a structure as we have designed, the operation of a motor vehicle is much simplified, the wearing parts are reduced and a great deal more clearance space can be had in the front seat or seats of the vehicle.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Figure 1 is a sectional view of the gear casing showing the top plan of the gearing. Fig. 2 is a similar view showing the side elevation of the gearing. Fig. 3 is a sectional view taken on a line X—X of Fig. 2 with some of the parts not shown. Fig. 4 is a plan view of the steering wheel of the vehicle showing the selector mounted thereon. Fig. 5 is a side elevation showing the connection of the clutch lever with the shifting rod and also the connection of the selector quadrant with the selector bar.

Referring now more particularly to the characters of reference on the drawings, the numeral 1 designates the gear casing which may be of any desired type. For the purpose of our improved structure, we provide along the length of the gear casing at any suitable point, an angle-shaped guide bar 2, the purpose and function of which will presently appear.

The numeral 3 designates the driving shaft from the motor of the vehicle which has a suitable bearing and projects into the gear casing 1 where it is keyed to and drives the pilot gear 4.

The numeral 5 designates the driven shaft turnably mounted on which, at spaced points, are the various driven gears $4^a$, $4^b$ and $4^c$. On the face of the gear 4 is a clutch member 6 and on the faces of the gears $4^a$, $4^b$ and $4^c$ are similar clutch members $6^a$, $6^b$, and $6^c$ respectively.

The numeral 7 designates the intermediate shaft suitably journaled within the casing 1 and keyed to which are gears, 8, $8^a$, $8^b$ and $8^c$. The gears 8, $8^a$, and $8^b$ are in continual engagement with the gears, 4, $4^a$ and $4^b$ respectively while the gear $8^c$ is in mesh with the intermediate small gear $8^b$ which in turn is in mesh with the gear $4^c$, this whole combination being the reverse gearing as is apparent.

Slidably keyed to the shaft 5, adjacent the clutch members 6, $6^a$, $6^b$ and $6^c$ respectively, are clutch members 9, $9^a$, $9^b$ and $9^c$, arranged to be brought into engagement with their adjacent clutch members on the gears at times and in a manner as will hereinafter appear.

The numeral 10 designates a rod or shaft slidably mounted within the casing 1, and connected with the clutch lever $10^a$ of the motor vehicle whereby with the movement of the clutch lever the said shaft 10 will move in one direction or the other. This said rod or shaft 10 is slidable through projecting arms 11, $11^a$ and $11^b$ extending outwardly from the guide bar 2.

Slidable on the rod 10 are boxes 12, $12^a$, $12^b$ and $12^c$, one adjacent each of the clutch members 9, $9^a$, $9^b$ and $9^c$ respectively. On the said boxes just mentioned, are projecting arms or yokes 13, $13^a$, $13^b$ and $13^c$ each turnably engaging one of the clutch members, 9, $9^a$, $9^b$ and $9^c$ respectively. On the opposite sides of the boxes 12 are fingers 14, $14^a$, $14^b$ and $14^c$ provided on their outer edges with lugs 15, $15^a$, $15^b$ and $15^c$ respectively. Interposed between the boxes 12, $12^a$, and $12^b$ and the members 11, $11^a$ and $11^b$ are springs 16, $16^a$ and $16^b$ respectively, and between the boxes $12^c$ and the end bearing $11^c$ of the rod 10 is a similar spring $16^c$. Secured to the rod 10 at normal spaced distances from the boxes 12, $12^a$, $12^b$ and $12^c$ respectively are collars 17, $17^a$, $17^b$ and $17^c$. Slidable in the guide bar 2 is a selector rod 18 provided with tripping cams 19, $19^a$, $19^b$ and $19^c$.

Pivotally mounted on a pin 20 secured to the bar 2 adjacent the box 12 is a trip member comprising two parts 21 and 22 hinged together by the pin 20, there being a spring 23 of suitable structure extending along the length of the parts 21 and 22 to hold them in normal longitudinal alinement. The member 21 has a depending lug 24 normally extending in the path of the cam 19. A spring 25 secured to the bar 2 engages the end of the member 21 to normally hold the member 22 in engagement with the lug 15, in which position the box 12 is so located on the rod 10 as to cause the yoke 13 to hold the clutch member 9 out of engagement with the clutch member 6.

Secured to the bar 2, adjacent the box $12^a$, are parts 20, $21^a$, $22^a$, $23^a$, $24^a$ and $25^a$ of similar structure to the parts 20 to 25 inclusive. Likewise, adjacent the members $12^b$ and $12^c$, are parts $20^b$ to $25^b$ both inclusive and parts $20^c$ to $25^c$ both inclusive.

Mounted on the steering wheel 26 of the vehicle is a small selector quadrant 27 having indicating numerals or letters thereon to indicate the different speeds, while the numeral 28 is a small selector lever movable over the same. The lever 28 is provided with a rod $28^a$ which extends through the steering post of the vehicle and is provided with an arm $28^b$ connected by a ball and socket joint $28^c$ with a rod $28^d$ which in turn is connected by a ball and socket joint $28^e$ with the rod 18. By means of this structure, with the movement of the lever 28 the rod 18 will be moved as is desired.

Describing now the operation of the device, we will assume that the gears are in neutral position. When in this position, all of the cams 19, $19^a$, $19^b$ and $19^c$ are out of engagement with the corresponding lugs 24, $24^a$, $24^b$ and $24^c$, and all of the members 22, $22^a$, $22^b$ and $22^c$ are in engagement with the lugs 15, $15^a$, $15^b$ and $15^c$, so that the clutch members 9, $9^a$, $9^b$ and $9^c$ are out of engagement with the clutch members 6, $6^a$, $6^b$ and $6^c$. With the parts mentioned in the positions indicated, the operation of the shaft 3 drives the gears 4 and 8, $8^a$ and $4^a$, $8^b$ and $4^b$, $8^c$ and $4^c$, without affecting any movement of the shaft 5. Assuming that it is desired to start in low gear, the operator moves the selector lever 28 to the point indicated on the quadrant as low gear and with this movement the selector bar 18 is moved so that the cam $19^b$ moves into engagement with the lug $24^b$. This moves the member $21^b$ on its pivotal point $20^b$ into horizontal position. The member 22 is held against movement by the frictional engagement against the lug 15, by reason of the pressure of the spring $16^b$. The clutch of the vehicle is then moved out and in and with its movement it operates the shaft 10. With the outward movement of the shaft 10 the collars 17, $17^a$, $17^b$ and $17^c$ are moved into engagement with the boxes 12 to $12^c$ both inclusive respectively, and said boxes are moved backward against their respective springs 16 to $16^c$. With this action the member $22^b$ is released from its frictional engagement with the lug $15^b$ and the spring $23^b$ throws it to alined horizontal position with the member 21. With the return motion of the clutch, the shaft 10 moves in the reverse direction relieving the collars 17 to $17^c$ inclusive from engagement with the boxes 12 to $12^c$ inclusive. All of the boxes 12, $12^a$ and $12^c$ however are held against any movement by reason of their engagement with the members 22, $22^a$ and $22^c$. The box $12^b$ however is released from engagement with the member $22^b$ in the manner indicated above, and when the collar $17^b$ moves away therefrom it leaves it free to be forced forward by the action of the spring $16^b$, which forward movement of the box $12^b$, causes the yoke $13^b$ to move the clutch $9^b$ into engagement with the clutch $6^b$ thus connecting the gear $4^b$ with the shaft 5 and causing such shaft 5 to revolve. To change the speed from low to intermediate, the selector lever 28 is moved to the point indicated as intermediate on the quadrant 27, and this action moves the cam $19^b$ out of engagement with the lug $24^b$ and moves the cam $19^a$ into engagement with the lug $24^a$. Then, when the clutch is thrown out, and the rod 10 moves, and the boxes 12 to $12^c$ respectively are moved backward against their springs, the following action takes place, to-wit: The spring $25^b$ acts against the members $21^b$—$22^b$ to move the member $22^b$ into the path of the lug $15^b$. At the same time, the lug $15^a$ is relieved from the member $22^a$ and it is forced to horizontal position, leaving the box 12ᵃ ready for free movement. Then when the clutch is let in again and the rod 10 moves to carry the collars 17 to 17ᶜ away from the boxes 12 to 12ᶜ, the member 22ᵇ engages the lug 15ᵇ and prevents the clutch 9ᵇ from again engaging with the clutch 6ᵇ, while at the same time, the box 12ᵃ is free to move and is forced by its spring 16ᵃ to throw the clutch 9ᵃ into engagement with the clutch 6ᵃ with the desired result.

Having given an example of how two different speeds may be obtained, we do not believe it necessary to enter into a detailed description of how other speeds may be had, but it is sufficient to say that the cams 19, 19ᵃ, 19ᵇ and 19ᶜ are so positioned as to allow no two of said members to engage two of the lugs 24 and 24ᵇ at the same time. Hence with the movement of the selector bar 18 to bring these cams into engagement with one or the other of their respective corresponding lugs, the desired change of gear can thereafter be had merely by throwing the clutch lever forward and backward as described herein.

On the member 2 are a plurality of stops 2ᵃ, one in the path of each of the members 14 to 14ᶜ respectively so as to limit the movement of said members to prevent the clutches from binding.

Referring to the left hand clutch members 6 and 9, shown in Fig. 1, attention is called to the fact that the inclined faces on the clutch members, instead of inclining completely to the edges of the clutch members, are provided with shoulders 29 and 29ᵃ for engagement with each other, which shoulders form a lock against any undue movement of the clutch members when in engagement with each other, and at the same time prevent any interference with the engaging movement of the said clutch members.

While we have numbered and described only the left hand clutch members, it will be noted that all the others are of the same structure. We also wish to call particular attention to the fact that we have a neutral point between each of the lugs 19 to 19ᶜ respectively, hence by moving the lever 28 to any of the points on the quadrant 27 between the speed indications, this will leave the parts in neutral position and it is impossible for more than one speed to be selected at any one time, and the parts are always thrown to neutral position before selecting another gear so that there can be no chance of jamming or interference of the gears of different speeds.

From the foregoing description it will be readily seen that we have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described our invention what we claim as new and useful and desire to secure by Letters Patent is:

1. The combination with a plurality of sets of transmission elements, each set comprising a driving member and a driven member arranged to be carried into driving relation with each other, tripping members each arranged for engagement with one member of each set to normally hold it out of driving relation with its corresponding member, means for setting one of said tripping members ready to be released from such engagement, means for moving all the other tripping members into engaging position and simultaneously releasing the set member, and means for driving the released set of transmission elements into driving relation with each other, as described.

2. The combination with a driving shaft and a driven shaft and a clutch rod, of transmission elements interposed between the driving shaft and the driven shaft, means normally holding the transmission elements out of driving relation with each other, means for setting the holding means ready to be released upon the actuation of the clutch rod, means for releasing the holding means upon the said actuation of the clutch rod, and means for moving the elements into driving relation with each other when so released, as described.

3. The combination with a rotatable shaft, of a member rotatable with the shaft, a member slidable on the shaft and arranged to be brought into driving relation with the rotatable member, a spring pressed member engaged with the slidable member to carry it into engagement with the rotatable member, a tripping member normally engaging the spring pressed member to hold the slidable member from engagement with the rotatable member, and a slidable member arranged to be brought into engagement with the tripping member to disengage it from the spring pressed member, as described.

4. The combination with a rotatable shaft, of a member rotatable with the shaft, a member slidable on the shaft and arranged to be brought into driving relation with the rotatable member, a spring pressed member engaged with the slidable member to carry it into engagement with the rotatable member, a tripping member normally engaging the spring pressed member to hold the slidable member from engagement with the rotatable member, a slidable member arranged to be brought into engagement with the tripping member to disengage it from the spring pressed member, and independent means for returning the spring pressed member into engagement with the tripping member, as described.

5. The combination with a set of transmission elements arranged to be brought into driving relation with each other, of a spring pressed member engaging one element, a pivoted trip member normally blocking the path of the spring pressed member to hold the elements out of driving relation with each other, a member engageable with the trip to set it ready to be disengaged from the spring pressed member, a member movable against the spring pressed member to disengage it from the trip, and means for moving the trip out of the path of the spring pressed member when so disengaged to allow the spring pressed member to be moved to place the transmission elements in driving relation with each other, as described.

6. The combination with a set of transmission elements arranged to be placed in driving relation with each other, a slidable shaft disposed independently of the transmission elements, a spring pressed collar slidable on the shaft and connected with one of said elements, a trip engaging the collar to hold the elements out of driving relation with each other, a member on the shaft arranged to engage the collar with the sliding movement of the shaft to move it away from the trip, and means for moving the trip out of the path of the collar when so disengaged to allow of the spring pressed collar being moved with the return movement of the shaft to place the elements in driving relation with each other, as described.

7. The combination with two transmission elements arranged to be brought into driving relation with each other, of a pivoted trip engaging one of said elements to hold the elements out of driving relation with each other, such trip comprising two members hinged together, a spring interposed between said members to normally tend to maintain said hinged members in alinement with each other, means engageable with one of said hinged members to move it on its hinged point while the other member is still in engagement with one of said elements, means for moving such element out of engagement with the trip to allow the spring to move the other member of the trip out of the path of the element whereby the elements may be moved into driving relation with each other, as described.

8. The combination with a pair of transmission elements arranged to be brought into driving relation with each other, of a pivoted trip normally engaging one element to hold the elements out of driving relation with each other, such trip comprising two members hinged together, a projecting lug on one of said hinged members, a slidable bar having a cam engageable with the lug to move said hinged member on its hinged point, means for moving the transmission element out of engagement with the trip, means for alining the hinged members out of the path of the transmission element when so disengaged to allow of the transmission elements being brought into driving relation with each other, as described.

9. The combination with a driving shaft and a driven shaft, transmission elements interposed between the driving and driven shafts, and means for placing said transmission elements in and out of driving relation with the driven shaft, such means comprising a clutch slidably mounted on the driven shaft and engageable with one of the transmission elements, a member normally holding the clutch out of engagement with the transmission elements, a sliding bar, and means on the sliding bar engageable with said member to disengage it from the clutch and allow the clutch to be moved into engagement with the transmission elements, as described.

10. The combination with a driving shaft and a driven shaft, transmission elements interposed between the driving and driven shafts, and means for placing said transmission elements in and out of driving relation with the driven shaft, such means comprising a clutch slidably mounted on the driven shaft and engageable with one of the transmission elements, a member normally holding the clutch out of engagement with the transmission elements, a sliding bar, means on the sliding bar engageable with said member to disengage it from the clutch and allow the clutch to be moved into engagement with the transmission elements, and a spring arranged to force the clutch into engagement with the transmission elements, as described.

11. A device of the character described comprising the combination with a driving shaft and a driven shaft, a gear driven by the driving shaft and a gear turnable on the driven shaft, intermediate gears arranged between said first named gears, a clutch slidable on the driven shaft and arranged to be moved into engagement with the gear on said shaft, a spring pressed tripping member fulcrumed independently of the clutch and engageable with the same to hold it normally out of engagement with the gear, a slidable member arranged to be brought into engagement with said tripping member to disengage it from said clutch and allow the clutch to be moved into engagement with the gear, as described.

12. The combination with a driving shaft and a driven shaft, and a plurality of transmission elements interposed between the two, of a means for placing each of the transmission elements into driving relation with the driven shaft at selected times, such means comprising a slidable clutch mounted on the driven shaft adjacent each element and arranged for engagement with such element, tripping members fulcrumed independently of the clutches and arranged to normally engage such clutches to hold them out of engagement with the elements, a slidable member arranged to engage one of said engaging members at a time to move it out of engagement with its clutch and allow the clutch to be moved into engagement with its element, and independent means for moving the clutches, as described.

In testimony whereof, we affix our signatures.

EARL W. SMITH.
EUGENE V. SMITH.